Figure 1:
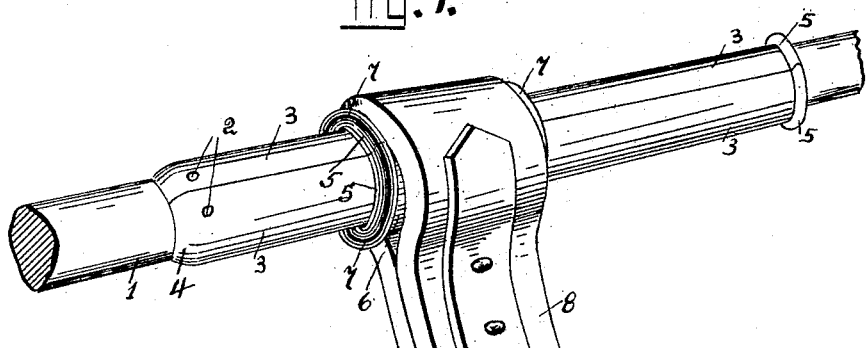

No. 799,586. PATENTED SEPT. 12, 1905.
H. D. AUPKE.
ATTACHMENT FOR SHAFTS.
APPLICATION FILED OCT. 27, 1904.

Witnesses:
C. Hortmann
K. H. Butler

Inventor:
Henry D. Aupke.
by N. C. Evert & Co.
Attorneys.

UNITED STATES PATENT OFFICE.

HENRY D. AUPKE, OF SHARPSBURG, PENNSYLVANIA.

ATTACHMENT FOR SHAFTS.

No. 799,586.     Specification of Letters Patent.     Patented Sept. 12, 1905.

Application filed October 27, 1904. Serial No. 230,257.

*To all whom it may concern:*

Be it known that I, HENRY D. AUPKE, a citizen of the United States of America, residing at Sharpsburg, in the county of Allegheny and State of Pennsylvania, have invented certain new and useful Improvements in Attachments for Shafts, of which the following is a specification, reference being had therein to the accompanying drawings.

This invention relates to certain new and useful improvements in attachments for shafts, and has for its object the provision of novel means whereby the depending tugs of a harness-saddle may be slidably mounted upon the shafts to support the same.

Another object of this invention is to provide novel means whereby the rearward movement of the tugs will be limited when the vehicle is being moved backward by an animal harnessed between the shafts of the vehicle, and in constructing my improved attachment I have made the same whereby it may be readily applied to shafts and harnesses that are now in use without changing the general construction of either one.

With the above and other objects in view the invention consists in the novel construction, combination, and arrangement of parts, which will be hereinafter more fully described and then specifically pointed out in the claim, and, referring to the drawings accompanying this application, like numerals of reference designate corresponding parts throughout the several views, in which—

Figure 2:
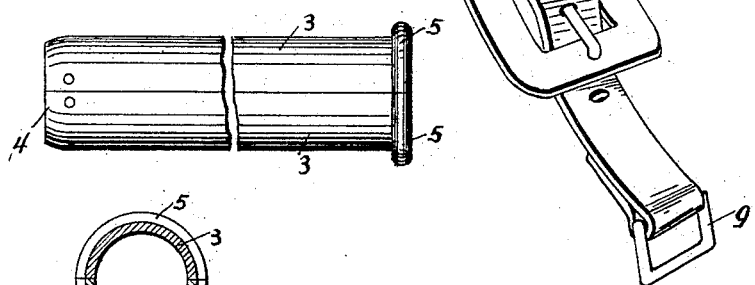
Figure 3:
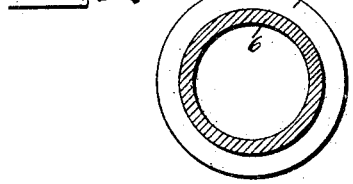

Figure 1 is a perspective view of a portion of one of the shafts of a vehicle, showing the harness-tug in position thereon. Fig. 2 is a side elevation of a casing used in connection with the shafts. Fig. 3 is a transverse sectional view of the same, and Figs. 4 and 5 are detail views of a sleeve which is mounted upon the casing.

In the drawings accompanying this application the reference-numeral 1 designates one of the shafts of a vehicle, and upon this shaft I intend to secure by rivets 2 2 a casing, this casing consisting of two semicylindrical shells 3 3, the one end of said shells being tapered, as indicated at 4, while the other ends thereof are provided with flanges 5 5. When placing the shells upon a shaft, the flanged ends are arranged nearest the vehicle, the object of which will be hereinafter more fully described.

Figures 4, 5:
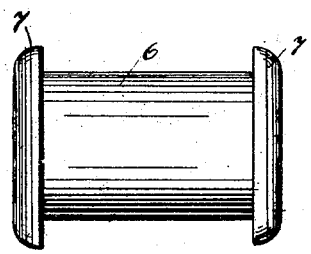

In Figs. 4 and 5 of the drawings I have illustrated a sleeve 6, the ends of this sleeve being flanged, as indicated at 7 7, and the sleeve is adapted to be placed upon the casing carried by the shafts, and the tug 8 is adapted to surround the sleeve and retain the same thereon, as illustrated in Fig. 1 of the drawings. The tug is of the ordinary construction and is secured to the harness-saddle (not shown) by the link 9.

It will be observed from Fig. 1 of the drawings that the tug 8 may be easily and quickly secured or placed upon the shaft, the sleeve of my improved attachment slipping upon the tapering ends of the semicylindrical sections 3, and the rearward movement of the same toward the vehicle will be limited by the flanges 5 5, formed upon the rear ends of the semicylindrical sections 3. The tug will be permitted to slide upon the shaft and prevent the shaft and the tug from becoming worn by the frictional engagement of the tug with the shaft.

It will be noted that various changes may be made in the details of construction without departing from the general spirit and scope of the invention.

Having fully described my invention, what I claim, and desire to secure by Letters Patent, is—

A shaft, a cylindrical two-part shell rigidly fixed on said shaft, and having a tapering inner end, a flange formed integral with the other end of said shell, combined with a cylindrical sleeve, a flange integral with each end of said sleeve, and having a beveled outer face, and a tug in which said sleeve is carried and in which it is held by the flanges on said sleeve, substantially as described.

In testimony whereof I affix my signature in the presence of two witnesses.

HENRY D. AUPKE.

Witnesses:
    R. A. SAINT,
    K. H. BUTLER.